(12) United States Patent
Choi

(10) Patent No.: US 11,027,732 B2
(45) Date of Patent: Jun. 8, 2021

(54) APPARATUS AND METHOD FOR CONTROLLING REVERSE DRIVING

(71) Applicant: MANDO CORPORATION, Pyeongtaek-si (KR)

(72) Inventor: Jae Bum Choi, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 16/781,599

(22) Filed: Feb. 4, 2020

(65) Prior Publication Data

US 2020/0172104 A1 Jun. 4, 2020

Related U.S. Application Data

(63) Continuation-in-part of application No. 16/595,815, filed on Oct. 8, 2019.

(30) Foreign Application Priority Data

Oct. 8, 2018 (KR) ........................ 10-2018-0120061

(51) Int. Cl.
*B60W 30/18* (2012.01)
*B60W 60/00* (2020.01)
*G05D 1/02* (2020.01)

(52) U.S. Cl.
CPC .. *B60W 30/18036* (2013.01); *B60W 60/0017* (2020.02); *B60W 60/0025* (2020.02);
(Continued)

(58) Field of Classification Search
CPC ....... B60W 30/18036; B60W 60/0017; B60W 60/0025; B60W 2554/20; B60W 2420/42;
(Continued)

(56) References Cited

U.S. PATENT DOCUMENTS

| 9,731,724 B2 | 8/2017 | Yoon | |
|---|---|---|---|
| 2009/0037033 A1* | 2/2009 | Phillips | ................ G05D 1/0278 701/2 |

(Continued)

FOREIGN PATENT DOCUMENTS

| JP | 2150396 B2 | 2/2013 |
|---|---|---|
| KR | 10-1751298 B1 | 7/2017 |
| KR | 10-2017-0118501 A | 10/2017 |

*Primary Examiner* — Michael V Kerrigan
(74) *Attorney, Agent, or Firm* — Morgan, Lewis & Bockius LLP

(57) ABSTRACT

An apparatus and a method for controlling a reverse driving are disclosed. The apparatus includes: a movement trace storage unit configured to detect and store the movement trace of the vehicle moving forward; a restricted driving area identifier configured to identify a restricted driving area; a reverse driving path determiner configured to identify whether a reverse driving request signal is received when the restricted driving area is identified, generate one or more driving paths, based on, the stored movement trace when the reverse driving request signal is received, and determine the reverse driving path, based on the one or more driving paths; and a movement controller configured to control movement of the vehicle to reverse the vehicle along the reverse driving path. The present disclosure has an effect of providing driving convenience by controlling a reverse driving when a vehicle enters a dead end or a one-way street.

22 Claims, 11 Drawing Sheets

(52) U.S. Cl.
CPC ....... *G05D 1/0214* (2013.01); *B60W 2420/42* (2013.01); *B60W 2552/05* (2020.02); *B60W 2554/20* (2020.02)

(58) Field of Classification Search
CPC ......... B60W 2552/05; B60W 30/0953; B60W 2556/50; B60W 2554/00; G05D 1/0214
See application file for complete search history.

(56) References Cited

U.S. PATENT DOCUMENTS

| | | | |
|---|---|---|---|
| 2017/0235313 A1* | 8/2017 | Sakamoto | G05D 1/0274 701/41 |
| 2017/0241794 A1 | 8/2017 | Koo et al. | |
| 2017/0301239 A1 | 10/2017 | Lee et al. | |
| 2018/0120853 A1* | 5/2018 | Seo | B62D 15/0285 |
| 2019/0270451 A1* | 9/2019 | Liu | G05D 1/0212 |

* cited by examiner

APPARATUS AND METHOD FOR CONTROLLING REVERSE DRIVING

CROSS REFERENCE TO RELATED APPLICATION

This application is a continuation-in-part of U.S. application Ser. No. 16/595,815 filed on Oct. 8, 2019, which claims priority from Korean Patent Application No. 10-2018-0120061, filed on Oct. 8, 2018, which is hereby incorporated by reference for all purposes as if fully set forth herein.

BACKGROUND OF THE INVENTION

1. Field of the Invention

The present disclosure relates to an apparatus and a method for controlling reverse driving.

2. Description of the Prior Art

Drivers feel more difficulty in reverse driving than forward driving of a vehicle. This is because the driver should control a steering wheel while directly identifying several devices, such as a room mirror, side mirrors, and a rear camera, in order to check a path and obstacles during reverse driving of the vehicle.

For example, when a driver of a vehicle enters a restricted driving area, such as a narrow road or a dead end or a one-way street, and desires to reverse the vehicle, the driver should perform reverse driving while avoiding obstacles by identifying an interval between the vehicle and obstacles and directly determining whether the reverse driving is possible. Further, since the driver should drive the vehicle while avoiding obstacles and make the vehicle not be on one side on the reverse driving path, the driver is required to be skilled in and have special attention to driving.

Accordingly, technology for controlling reverse driving to assist the driver in safely and conveniently reversing the vehicle is needed.

SUMMARY OF THE INVENTION

According to the described background, an aspect of the present disclosure is to provide an apparatus and a method for controlling a reverse driving to provide driving convenience by controlling autonomous reverse driving when a vehicle enters a dead end or a one-way street by mistake.

Another aspect of the present disclosure is to provide an apparatus and a method for controlling reverse driving to perform autonomous reverse driving while avoiding obstacles existing behind the vehicle.

In accordance with an aspect of the present disclosure, an apparatus for controlling a reverse driving is provided. The apparatus includes: an image sensor operable to be disposed on a vehicle so as to have a field of view of an exterior of the vehicle, the image sensor being configured to capture image data; a location information receiver configured to receive location information of the vehicle; and a controller comprising at least one processor configured to process at least one piece of the image data captured by the image sensor and the location information, wherein the controller identifies a restricted driving area, based on at least one of a processing result of the image data and the location information, determines a reverse driving path, based on a pre-stored movement trace of the vehicle when the restricted driving area is identified, and controls movement of the vehicle to reverse the vehicle along the reverse driving path.

In another aspect of the present disclosure, an apparatus for controlling reverse driving is provided. The apparatus includes: an image sensor operable to be disposed at a vehicle so as to have a field of view of an exterior of the vehicle, the image sensor being configured to capture image data; a non-image sensor operable to be disposed on the vehicle so as to have a field of sensing of an exterior of the vehicle, the non-image sensor being configured to capture sensing data; a location information receiver configured to receive location information of the vehicle; a domain control unit comprising a processor configured to process at least one piece of the image data captured by the image sensor and the sensing data captured by the non-image sensor and the location information, wherein the domain control unit detects and stores a movement trace of the vehicle moving forward, identify a restricted driving area, based on at least one of the processing result of the image data, the location information, and pre-stored map information, identifies whether a reverse driving request signal is received when the restricted driving area is identified, generates one or more driving paths, based on, the stored movement trace when the reverse driving request signal is received, determines the reverse driving path, based on the one or more driving paths, and controls movement of the vehicle to reverse the vehicle along the reverse driving path.

In another aspect of the present disclosure, a method of controlling a reverse driving is provided. The method includes: detecting and storing a movement trace of a vehicle moving forward; identifying a restricted driving area, based on at least one of a processing result of image data, location information, and pre-stored map information; identifying whether a reverse driving request signal is received when the restricted driving area is identified, generating one or more driving paths, based on, the stored movement trace when the reverse driving request signal is received, and determining the reverse driving path, based on the one or more driving paths; and controlling movement of the vehicle to reverse the vehicle along the reverse driving path.

As described above, according to the present disclosure, it is possible to provide an apparatus and a method for controlling reverse driving to provide driving convenience by controlling autonomous reverse driving when a vehicle enters a dead end or a one-way street by mistake.

Further, according to the present disclosure, it is possible to prevent a safety accident by providing an apparatus and a method for controlling reverse driving by which a vehicle can be autonomously reversed while avoiding obstacles existing behind the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1A:
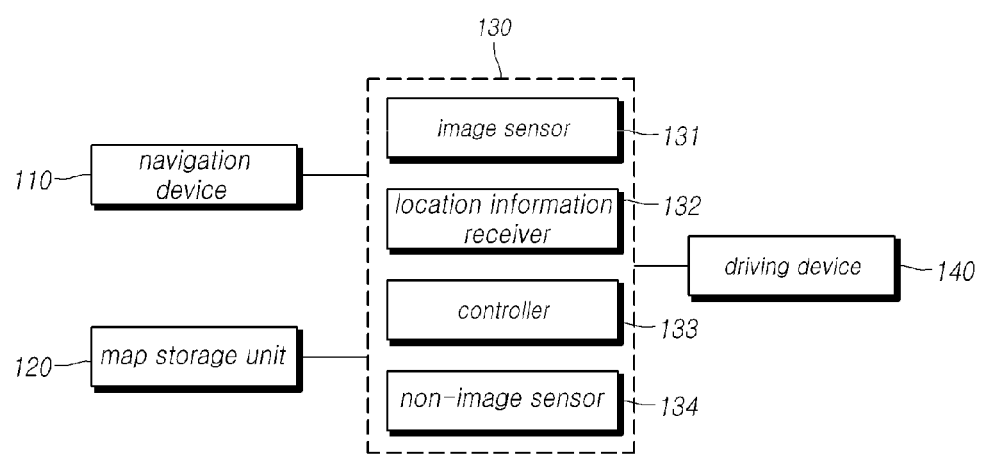
FIG. 1A illustrates elements included in an autonomous vehicle according to the present disclosure.
Figure 1B:
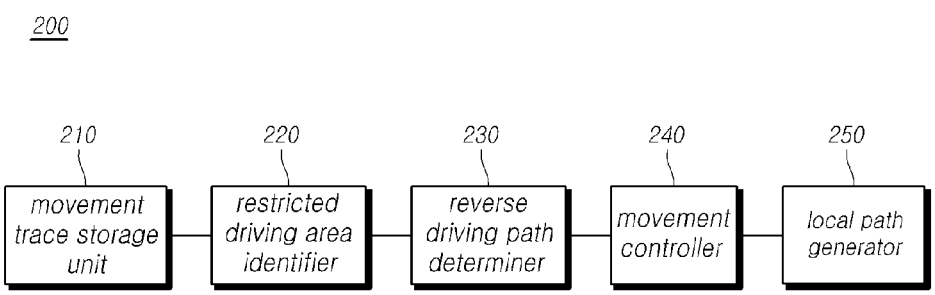
FIG. 1B illustrates elements included in a controller according to the present disclosure.

FIG. 1A illustrates elements included in an autonomous vehicle 10 according to the present disclosure, and FIG. 1B illustrates elements included in a controller 200 according to the present disclosure.

Referring to FIG. 1A, the autonomous vehicle 10 according to the present disclosure includes a navigation device 110, a map storage unit 120, a reverse driving control device 130, and a driving device 140.

The navigation device 110 may provide location information acquired by communication with a satellite through a GPS signal. The location information indicates information related to the location of the vehicle 10.

The map storage unit 120 may store map information indicating information on the map.

The rear drive control device 130 is a device for controlling, when it is identified that the vehicle 10 enters a dead end or a no passing road by mistake during forward driving, movement of the vehicle 10 to allow the vehicle 10 to perform the autonomous reverse driving.

The reverse driving control device 130 may receive information from the navigation device 110 and generate and output a reverse control signal.

The reverse control signal is a signal transmitted to the driving device 140 to control movement of the vehicle 10, such as a reverse driving speed, a steering angle, or braking of the vehicle 10 when the vehicle 10 is reversed.

The reverse driving control device 130 may include an image sensor 131, a location information receiver 132, a controller 133, and a non-image sensor 134.

The image sensor 131 may be disposed in the vehicle 10 to have a field of view of an exterior of the vehicle 10 and may capture image data.

At least one image sensor 131 may be mounted to each part of the vehicle 10 to have a field of view of the front, side, or rear of the vehicle 10.

Image information photographed by the image sensor 131 consists of image data, which corresponds to image data captured by the image sensor 131. Hereinafter, the image information photographed by the image sensor 131 may be image data captured by the image sensor 131. The image sensor 131 may be an image acquisition device comprising, but not limited to, a charge-coupled device (CCD), a CMOS image sensor, or a photo sensor including photodiodes. In one example, a camera may be used as the image sensor 131.

The image data captured by the image sensor 131 may be generated, for example, in one format of AVI, MPEG-4, H.264, DivX, and JPEG in a raw form. The image data captured by the image sensor 131 may be processed by a processor.

The location information receiver 132 may receive location information of the vehicle 10. Specifically, the location information receiver 132 may receive location information of the vehicle 10 provided from the navigation device 110 and provide the location information to perform calculations required for controlling the vehicle.

The controller 133 may include at least one processor configured to process at least one piece of the image data captured by the image sensor 131 and the location information.

The controller 133 may identify a restricted driving area on the basis of at least one of the processing result of image data and the location information, determine a reverse driving path on the basis of a pre-stored movement trace of the vehicle 10 when the restricted driving area is identified, and control movement of the vehicle to reverse the vehicle 10 according to the reverse driving path.

The controller 133 can be implemented as a Domain Control Unit (DCU) which may integrate and perform a function of receiving and processing information of several vehicle sensors or relaying transmission/reception of data generated by sensors and a function of controlling reverse driving of the vehicle 10 by transmitting data to a steering control module, an acceleration control module, and a brake control module.

The non-image sensor 134 may be disposed in the vehicle 10 to have a detection area for the outside of the vehicle 10, and may capture sensing data. The non-image sensor may include, for example, a radar sensor, a lidar sensor, and an ultrasound sensor.

According to an embodiment, the reverse driving control device 130 according to the present disclosure using the DCU and the non-image sensor 134 includes the image sensor 131 operable to be disposed on the vehicle 10 so as to have a field of view of an exterior of the vehicle 10, the image sensor 131 being configured to capture image data, the non-image sensor 134 operable to be disposed on the vehicle 10 so as to have a field of sensing of an exterior of the vehicle 10, the non-image sensor 134 being configured to capture sensing data; the location information receiver 132 configured to receive location information of the vehicle 10; the domain control unit (DCU) including a processor configured to process at least one piece of the image data captured by the image sensor 131 and the sensing data captured by the non-image sensor 134 and the location information. The domain control unit (DCU) detects and stores a movement trace of the vehicle moving forward, identifies a restricted driving area, based on at least one of the processing result of the image data, the location information, and pre-stored map information, identifies whether a reverse driving request signal is received when the restricted driving area is identified, generates one or more driving paths, based on, the stored movement trace when the reverse driving request signal is received, determines the reverse driving path, based on the one or more driving paths, and controls movement of the vehicle 10 to reverse the vehicle 10 along the reverse driving path.

Meanwhile, the controller 133 may include elements for performing the above-described operations, respectively. The detailed elements of the controller 133 are illustrated in FIG. 1B.

Referring to FIG. 1B, a controller 200 according to the present disclosure may include a movement trace storage unit 210, a restricted driving area identifier 220, a rear driving path determiner 230, and a movement controller 240.

The movement trace storage unit 210 may detect and store a movement trace of the forward moving vehicle 10.

The movement trace is a trace along which the vehicle 10 moves while the vehicle 10 forward moves.

The movement trace may be basically calculated using location information of the vehicle 10. A detailed method thereof will be described with reference to FIGS. 2 and 3.

The restricted driving area identifier 220 may identify a restricted driving area on the basis of at least one of the processing result of the image data, the location information, and pre-stored map information.

The restricted driving area includes not only an area in which driving is originally restricted, such as a dead end or a one-way street but also an area, which is originally an area in which driving is possible but is not temporarily possible by other obstacles. However, the present disclosure is not limited thereto.

When the vehicle 10 enters a restricted driving area by mistake, the restricted driving area identifier 220 may identify the restricted driving area, detect a driving state of the vehicle 10, and pre-identify the restricted driving area before the vehicle 10 enters the restricted driving area.

When the restricted driving area is identified, the reverse driving path determiner 230 may identify whether a reverse driving request signal is received, generate one or more driving paths based on the stored movement trace when the reverse driving request signal is received, and determine a reverse driving path based on the one or more driving paths.

The reverse driving request signal is a signal input by a driver or a user to allow the vehicle 10 to perform the autonomous reverse driving. The reverse driving request signal is an electric signal generated by a physical button or a touch screen.

The driving path is a path which the reverse driving path determiner 230 generates for a drive from the location of the vehicle 10, at a time point when the reverse driving request signal is received, to a destination which the driver desires to reach. The number of driving paths may be one or more.

Among the driving paths, the reverse driving path refers to a driving path used when the vehicle 10 is reversed. The reverse driving path is determined on the basis of the generated driving paths. A detailed method thereof will be described below with reference to FIGS. 5 to 7.

The movement controller 240 may control movement of the vehicle 10 to allow the vehicle 10 to be reversed along the reverse driving path. That is, the movement controller 240 may generate a reverse driving control signal and transfer the reverse driving control signal to the driving device 140 in order to control movement of the vehicle 10.

In order to control the reverse driving of the vehicle 10, the movement controller 240 may calculate at least one of a target acceleration, a target speed, and a target steering angle and control movement of the vehicle 10.

When the restricted driving area is identified, the movement controller 240 may first perform at least one control among deceleration control for decelerating the vehicle 10 and warning control for providing a warning.

For example, when the restricted driving area is identified, the movement controller 240 may generate a control signal to perform the warning operation in the vehicle 10 or put on the brake on the vehicle 10 and transfer the control signal to the driving device 140.

The controller 200 may further include a local path generator 250 configured to generate a local path on the basis of at least one of the processing result of image data and driving information of the vehicle 10.

The local path is a path on which the vehicle 10 should actually move while the vehicle 10 follows the reverse driving path. That is, when there are obstacles around the reverse driving path, the vehicle 10 is basically reversed along the reverse driving path but is reversed while controlling steering wheel in order to avoid the obstacles.

A method of generating the local path uses a Timed Elastic Band (TEB) algorithm. However, the present disclosure is not limited thereto.

The elements included in the controller 200 may be implemented as hardware, such as an Electronic Control Unit (ECU), a Domain Control Unit (DCU), a Micro Controller Unit (MCU), and an Integrated Circuit (IC) and software, such as an algorithm.

The elements included in the controller 200 may transmit and receive signals to and from each other through Controller Area Network (CAN) communication.

The driving device 140 may receive a reverse driving control signal causing the vehicle 10 to move. Further, the driving device 140 may receive a control signal from the ECU causing the vehicle 10 perform the warning operation.

Accordingly, the driving device 140 may include an acceleration/deceleration device, a steering device, a brake device, and various warning devices. However, the present disclosure is not limited thereto.

Hereinafter, a detailed embodiment in which the movement trace storage unit 210 included in the drive control device 130 detects and stores a movement trace of the vehicle 10 will be described.

Figure 2:
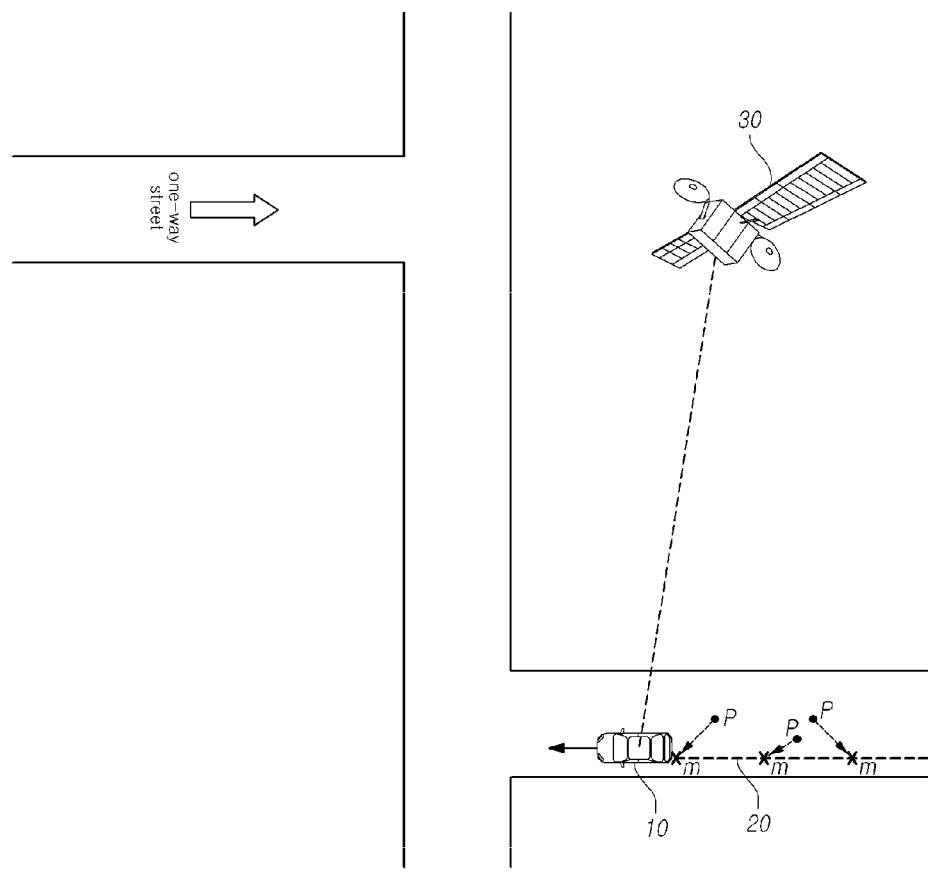
FIG. 2 schematically illustrates an embodiment in which a movement trace storage unit included in a reverse driving control device stores a movement trace of a vehicle according to the present disclosure.

FIG. 2 schematically illustrates an embodiment in which the movement trace storage unit 210 included in the drive control device 130 stores a movement trace 20 of the vehicle 10 according to the present disclosure.

Referring to FIG. 2, the movement trace 20 may be detected through a connection of location coordinates P of the vehicle 10 included in the location information of the vehicle 10, which is acquired by reception of a GPS signal from a satellite 30 through the navigation device 110.

Meanwhile, the location of the vehicle detected only on the basis of the location information of the vehicle 10 acquired through reception of the GPS signal form the satellite 30 may be different from the real location of the vehicle 10. Accordingly, it is required to correct the location information on the basis of map information and the processing result of the image data acquired through detection of surroundings of the vehicle 10.

For example, the movement trace storage unit 210 corrects the location information by matching the location information with the map information and the processing result of the image data while the vehicle 10 moves forward and detects the movement trace 20 from the corrected location information.

The location information is information acquired through reception of the GPS signal from the satellite 30 by the navigation device 110, and the map information is information acquired through extraction of map information corresponding to the location information by the map storage unit 120.

In other words, the movement trace storage device 210 extracts location coordinates P by analyzing the location information received from the navigation device 110, corrects the location coordinates P by matching the location information with the map information received from the map storage unit 120 and the processing result of the image data captured by the image sensor 131, and detects the movement trace 20 from the corrected location coordinates m.

The location coordinates P illustrated in FIG. 2 may be measured in every time unit and may be successively measured in real time. However, the present disclosure is not limited thereto.

Meanwhile, the movement trace storage unit 210 may partially store the movement trace in order to efficiently manage a storage capacity.

Figure 3:
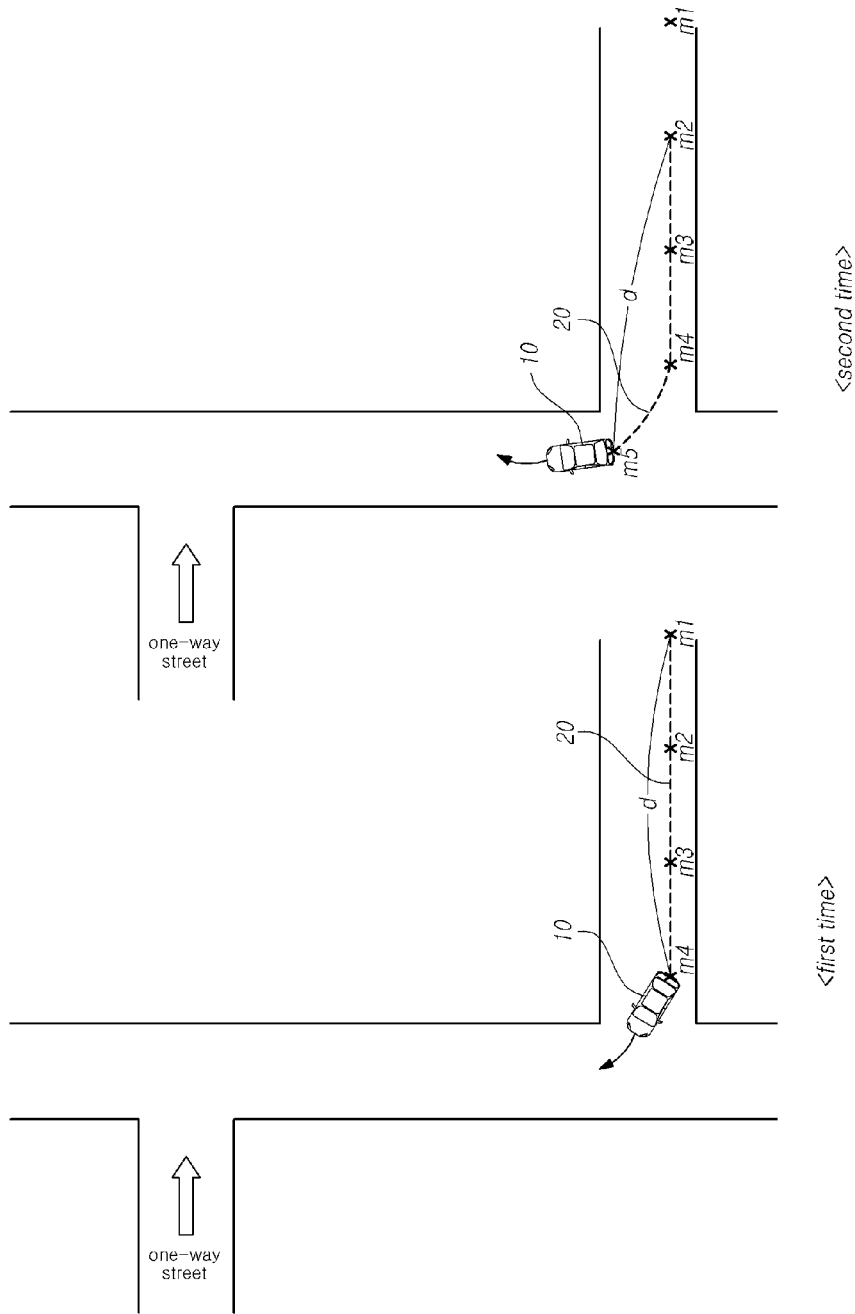
FIG. 3 schematically illustrates another embodiment in which the movement trace storage unit included in the reverse driving control device stores the movement trace of the vehicle according to the present disclosure.

FIG. 3 schematically illustrates another embodiment in which the movement trace storage unit 210 included in the reverse driving control device 130 stores the movement trace 20 of the vehicle 10 according to the present disclosure.

The movement trace storage unit 210 included in the reverse driving control device 130 according to the present disclosure may preset a reference distance d, store only the movement trace 20 corresponding to the reference distance d, and update and store the movement trace 20 while the vehicle 10 moves forward.

That is, the movement trace storage unit 210 stores the movement trace 20 corresponding to the preset reference distance d in the detected movement trace and updates the stored movement trace 20 in the unit of reference distance d while the vehicle 10 moves forward.

Referring to <first time> of FIG. 3, the movement trace storage unit 210 presets the reference distance d and stores the movement trace 20 from location coordinates m4 of the vehicle 10 at the first time to location coordinates m1 of the vehicle 10, which is spaced apart from the location coordinates m4 by the reference distance d, among previous location coordinates m1 to m3.

The movement trace storage unit 210 updates the previously stored movement trace 20 to store only the movement trace 20 corresponding to the reference distance d while the vehicle 10 continuously moves forward.

Referring to <second time> of FIG. 3, the movement trace storage unit 210 updates and stores the movement trace 20 from location coordinates m5 of the vehicle 10 at the second time of the vehicle to location coordinates m2 of the vehicle 10, which is spaced apart from the location coordinates m5 by the reference distance d, among previous location coordinates m1 to m4.

The movement trace from the location coordinates m2 of the vehicle to the location coordinates m1, which is stored at the first time, may be deleted at the second time.

Figure 4:
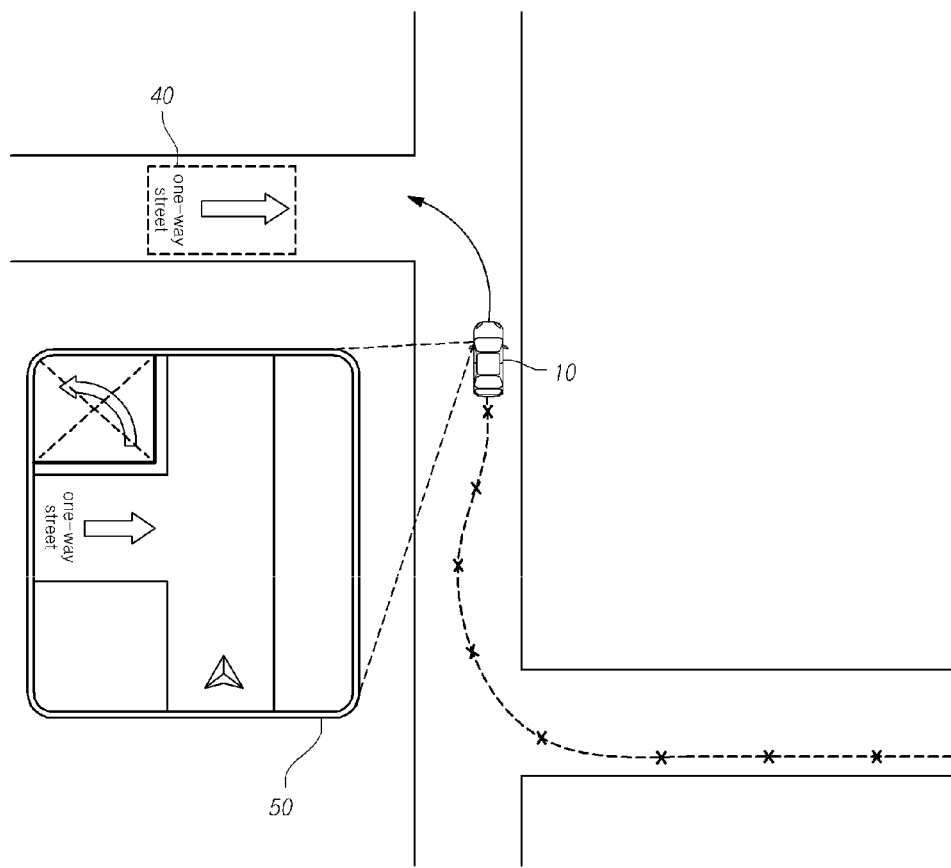
FIG. 4 schematically illustrates an embodiment in which a restricted driving area identifier included in the reverse driving control device identifies a restricted driving area according to the present disclosure.

FIG. 4 schematically illustrates an embodiment in which the restricted driving area identifier 220 included in the reverse driving control device 130 identifies the restricted driving area 40 according to the present disclosure.

Referring to FIG. 4, when the driver of the vehicle 10 determines that continuously driving the vehicle forward is not possible due to the existence of obstacles (not shown) on the road in front of the vehicle 10, the vehicle 10 may enter another road, for example, a road located at the left of the vehicle 10.

Meanwhile, when the other road is a restricted driving area 40 such as a dead end or a one-way street, the restricted driving area identifier 220 may inform the driver of the restricted driving area 40 before the vehicle 10 enters the restricted driving area 40.

For example, when a left turn signal of the vehicle 10 is turned on, the restricted driving area identifier 220 may predict a driving path of the vehicle 10 moving forward on the basis of location information of the vehicle 10 and map information corresponding to the location information of the vehicle 10, so as to identify the restricted driving area 40 in front of the vehicle 10.

In order to inform the driver of the vehicle entering the restricted driving area 40, the restricted driving area identifier 220 may display the restricted driving area 40 on a display screen 50 mounted to the vehicle 10. However, the present disclosure is not limited thereto.

When the restricted driving area identifier 220 identifies the restricted driving area 40, the driver may have difficulty in manually reversing the vehicle and thus it is required to allow the vehicle 10 to be autonomously reversed.

Hereinafter, an embodiment for determining a reverse driving path on which the vehicle 10 is autonomously reversed will be described.

Figure 5:
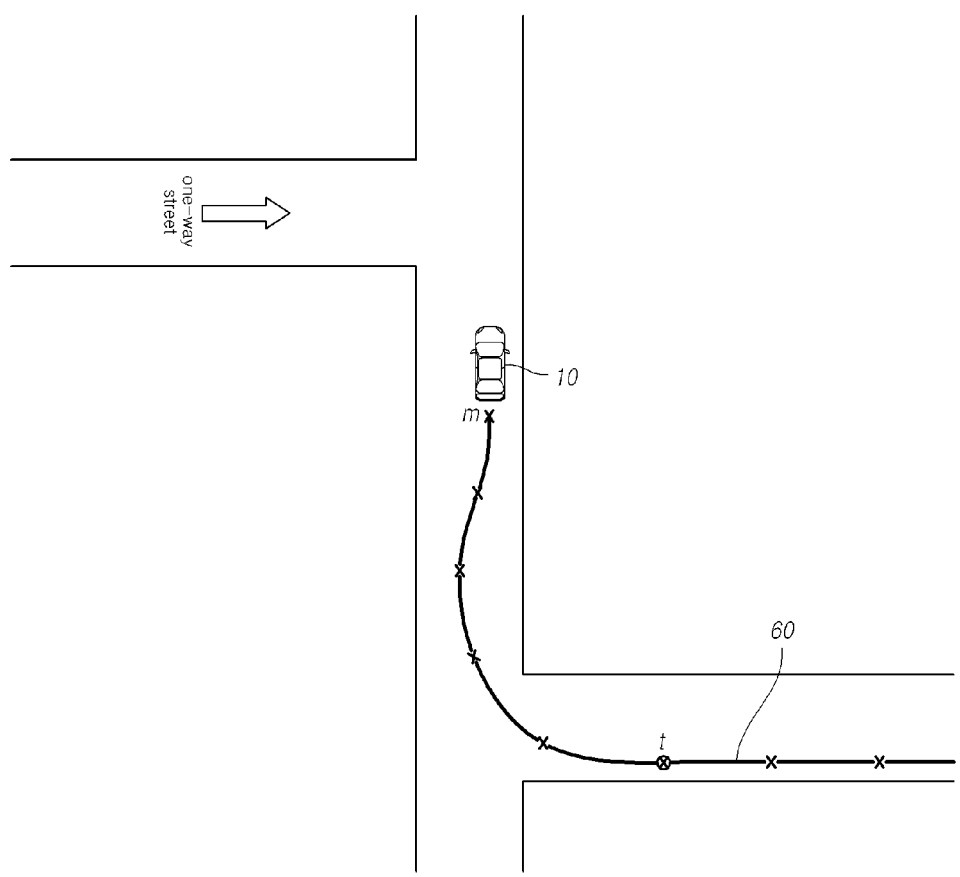
FIG. 5 schematically illustrates an embodiment in which a reverse driving path determiner included in the reverse driving control device determines a reverse driving path according to the present disclosure.

FIG. 5 schematically illustrates an embodiment in which the reverse driving path determiner 230 included in the reverse driving control device 130 according to the present disclosure determines a reverse driving path.

When the restricted driving area 40 is identified, the driver may generate a reverse driving request signal through a physical button.

Referring to FIGS. 2 to 5, the reverse driving path determiner 230 may receive a reverse driving request signal and determine a reverse driving path based on a driving path 60 generated on the basis of the movement trace 20 stored in the movement trace storage unit 210.

For example, the movement trace storage unit 210 corrects location information by matching the location information with map information and the processing result of image data while the vehicle 10 moves forward and detects the movement trace 20 from the corrected location information, and the reverse driving path determiner 230 generates the driving path 60 that matches the entire movement trace and determines the driving path 60 as the reverse driving path.

The reverse driving request signal may include indication information indicating a target point t. That is, the driver may generate a reverse driving request signal to make the vehicle 10 reversed up to only the target point t on the reverse driving path.

For example, the reverse driving path determiner 230 identify the target point t from the indication information and determine a path from a location m of the vehicle 10 to the target point t in the generated driving path 60 as the reverse driving path.

Although not illustrated, the reverse driving path determiner 230 may determine whether the vehicle 10 can be reversed along the reverse driving path on the basis of information on whether there is an obstacle detected on the driving path 60. When the vehicle cannot be reversed, the reverse driving path determiner 230 may generate a driving path different from the driving path 60 on the basis of the location information and the map information and determine again the driving path as the reverse driving path.

Figure 6:
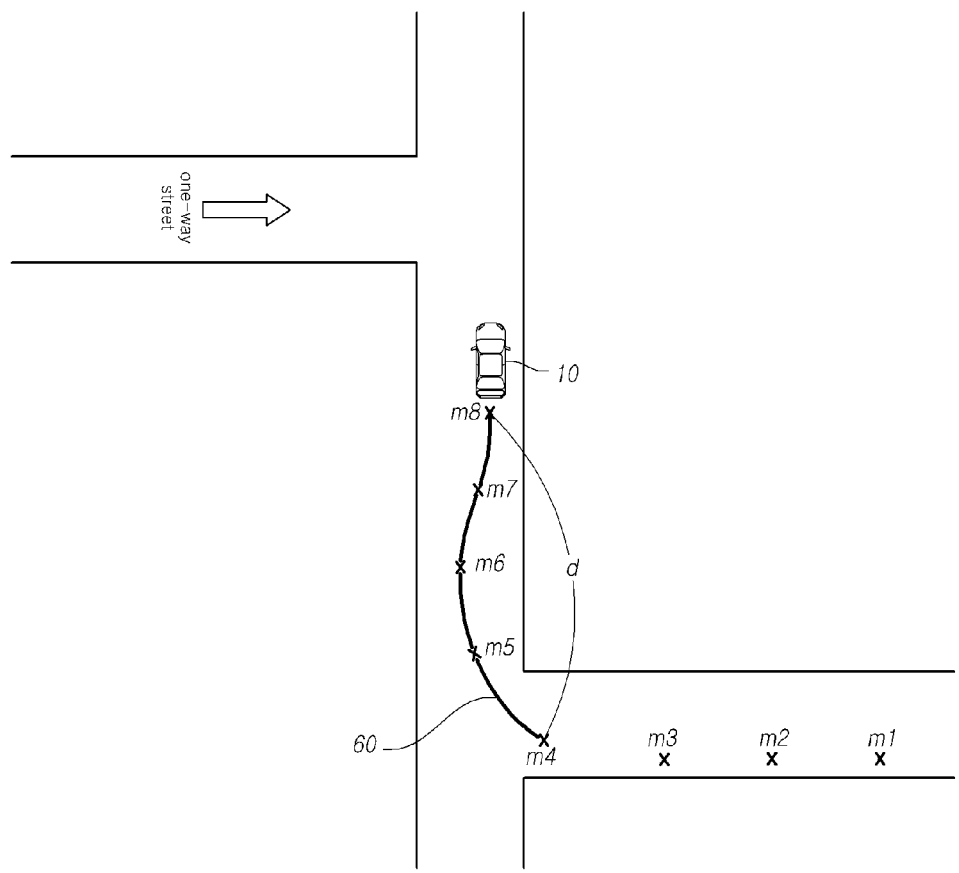
FIG. 6 schematically illustrates another embodiment in which the reverse driving path determiner in the reverse driving control device determines a reverse driving path according to the present disclosure.

FIG. 6 schematically illustrates another embodiment in which the reverse driving path determiner 230 included in the reverse driving control device 130 according to the present disclosure determines a reverse driving path.

Referring to FIGS. 3 and 6, when the movement trace storage unit 210 partially stores the movement trace 20 in order to efficiently manage the storage capacity, the reverse driving path determiner 230 may generate the driving path 60 that matches the partially stored movement trace 20 and determine the generated driving path 60 as the reverse driving path.

For example, the movement trace storage unit 210 stores the movement trace 20 corresponding to a preset reference distance d in the detected movement trace and updates the stored movement trace 20 in the unit of reference distance d while the vehicle 10 moves forward, and the reverse driving path determiner 230 generates the driving path 60 that matches the movement trace 20 and determines the driving path 60 as the reverse driving path.

The reference distance d is set from location coordinates m8 corresponding to the current location of the vehicle 10 to location coordinates m4 which is one of the previous location coordinates m7 to m1, but this merely helps in understanding of the present disclosure and the present disclosure is not limited thereto.

Figure 7:
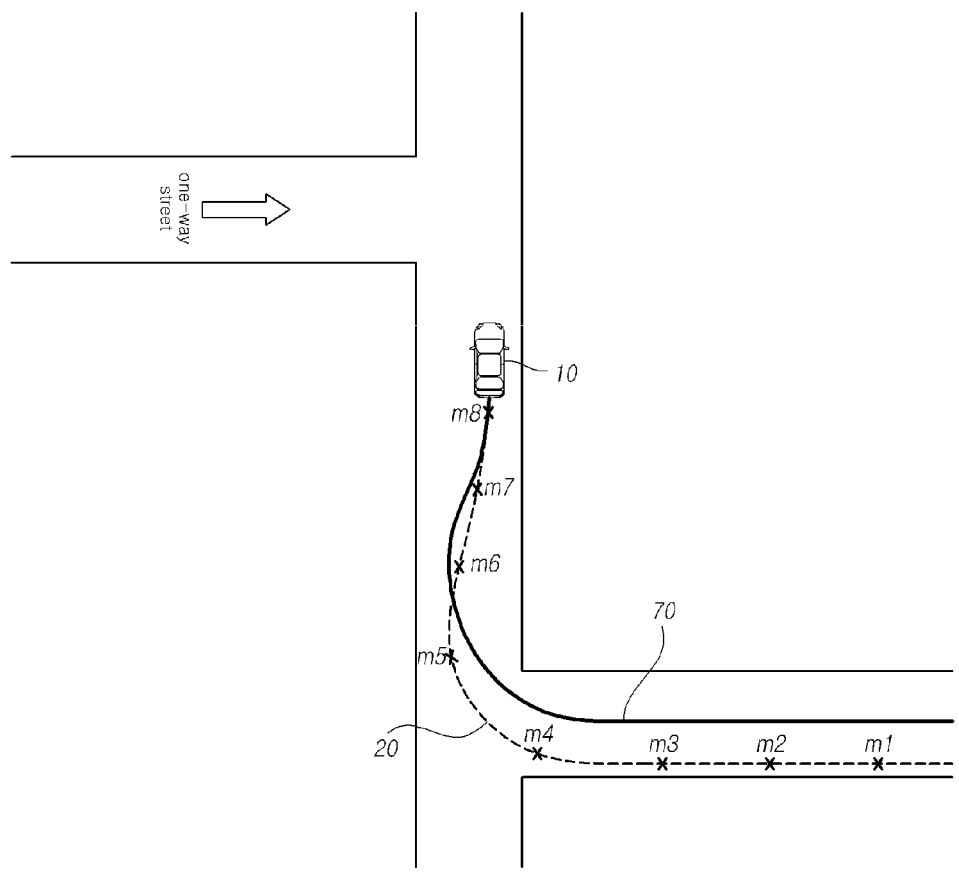
FIG. 7 schematically illustrates still another embodiment in which the reverse driving path determiner in the reverse driving control device determines a reverse driving path according to the present disclosure.

FIG. 7 schematically illustrates still another embodiment in which the reverse driving path determiner 230 included in the reverse driving control device 130 according to the present disclosure determines a reverse driving path.

Referring to FIGS. 2 and 7, when the vehicle 10 moves forward while leaning one side of the road, a driving path that matches the movement trace 20 is determined as a reverse driving path, and the vehicle 10 is reversed, the vehicle 10 may bump into or be scratched by a road curb or a surrounding obstacle.

Accordingly, the reverse driving path determiner 230 may generate a driving path based on map information in order to generate a safer driving path than the driving path that matches the movement trace 20.

For example, the reverse driving path determiner 230 generates a driving path 70 on the movement trace 20 on the basis of map information at the location of the vehicle 10 and determines the driving path 70 as the reverse driving path.

The location of the vehicle 10 corresponds to current location coordinates m8 of the vehicle 10 and previous location coordinates m1 to m7, the map information corresponds to the location of the vehicle 10, and the driving path 70 corresponds to a driving path based on the map.

Meanwhile, the reverse driving path determiner 230 may generate both the driving path 60 that matches the movement trace 20 and the driving path 70 based on the map information, and determine one of the two driving paths as the reverse driving path.

For example, the reverse driving path determiner 230 generates a first driving path 60 that matches the movement trace 20 and a second driving path 70 corresponding to the movement trace on the basis of the map information at the location of the vehicle, selects one of the first driving path 60 and the second driving path 70, and determines the selected driving path as the reverse driving path.

When the reverse driving path determiner 230 determines the reverse driving path, the vehicle 10 may be reversed along the reverse driving path. At this time, when there is an obstacle on the reverse driving path, it is required to generate a local path to make the vehicle 10 avoid the obstacle.

Figure 8:
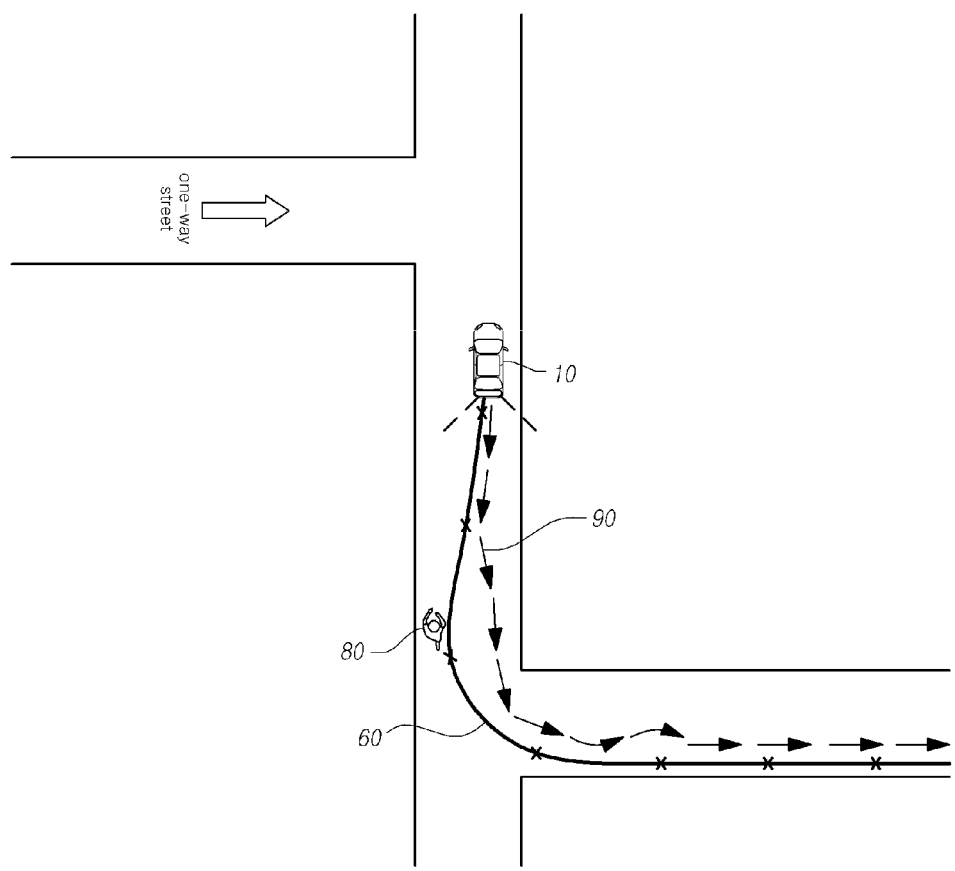
FIG. 8 schematically illustrates an embodiment in which a local path generator included in the reverse driving control device determines a local path according to the present disclosure.

FIG. 8 schematically illustrates an embodiment in which the local path generator 250 included in the reverse driving control device 130 according to the present disclosure determines a local path 90.

Referring to FIGS. 5 and 8, when the reverse driving path determiner 230 determines the driving path 60 as the reverse driving path, the local path generator 250 may generate the local path 90 to allow the vehicle 10 to avoid a collision in consideration of a possibility of a collision with a target 80 existing on the reverse driving path when the vehicle 10 is actually reversed along the reverse driving path.

Specifically, when at least one of the processing result of image data captured by the image sensor and the processing result of sensing data captured by the non-image sensor is transmitted to the local path generator 250 and when driving information of the vehicle 10 such as vehicle speed information and steering angle information is transmitted to the local path generator 250, the local path generator 250 generates a local path to avoid the collision with the target 80 by calculating the received processing result and driving information.

In one example, prior to determining the reverse driving path and in response to the detection of the restricted driving area, the controller 200 may control an output device such as a display or a speaker of the vehicle to output information, such as a warning message, indicating the restricted driving area. The controller 200 may be configured to receive a command from the driver through an input device, such as a button, a knob, a touchscreen, and a voice recognition device installed in the vehicle, whether to perform an autonomous reverse driving operation, and be configured to control the vehicle based on the received command.

In one example, prior to determining the reverse driving path and in response to a receipt of a turn signal to the restricted driving area, the controller 200 may control the output device to output the information indicating the restricted driving area. The controller 200 may be configured to receive a command from the driver through the input device whether to perform an autonomous reverse driving operation, and be configured to control the vehicle based on the received command.

In one example, prior to determining the reverse driving path and in response to a determination that the vehicle drives towards the restricted driving area, the controller 200 may control the output device to output the information indicating the restricted driving area. The controller 200 may be configured to receive a command from the driver through the input device whether to perform an autonomous reverse driving operation, and be configured to control the vehicle based on the received command.

In one example, prior to determining the reverse driving path and in response to a determination that the vehicle drives in the restricted driving area, the controller 200 may control the output device to output the information indicating the restricted driving area. The controller 200 may be configured to receive a command from the driver through the input device whether to perform an autonomous reverse driving operation, and be configured to control the vehicle based on the received command.

Hereinafter, a reverse driving control method by which the present disclosure can be implemented will be described.

Figure 9:
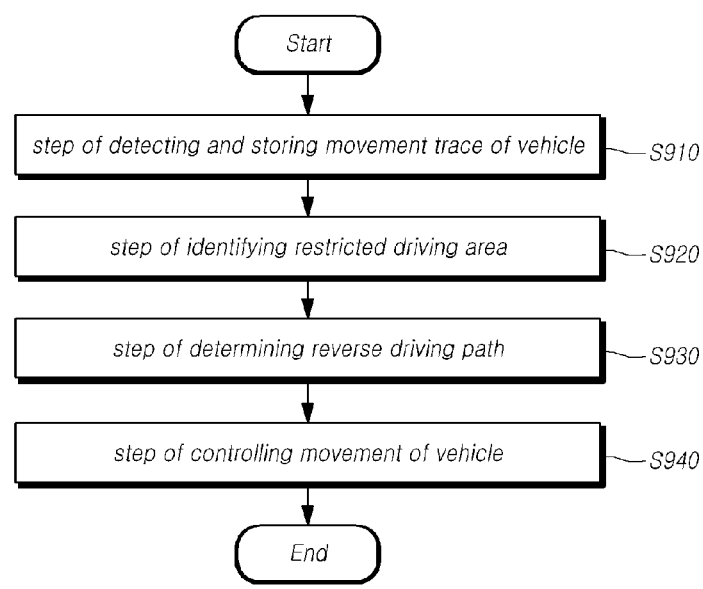
FIG. 9 is a flowchart illustrating an embodiment of a reverse driving control method according to the present disclosure.

FIG. 9 is a flowchart illustrating an embodiment of a reverse driving control method according to the present disclosure.

Referring to FIG. 9, the reverse driving control method according to the present disclosure may include a step S910 of detecting and storing a movement trace of a vehicle moving forward, a step S920 of identifying a restricted driving area, based on at least one of a processing result of image data, location information, and pre-stored map information, a step S930 of identifying whether a reverse driving request signal is received when the restricted driving area is identified, generating one or more driving paths, based on, the stored movement trace when the reverse driving request signal is received, and determining the reverse driving path, based on the one or more driving paths, and a step S940 of controlling movement of the vehicle to reverse the vehicle along the reverse driving path.

Hereinafter, a detailed embodiment of the reverse driving control method according to the present disclosure will be described.

Figure 10:
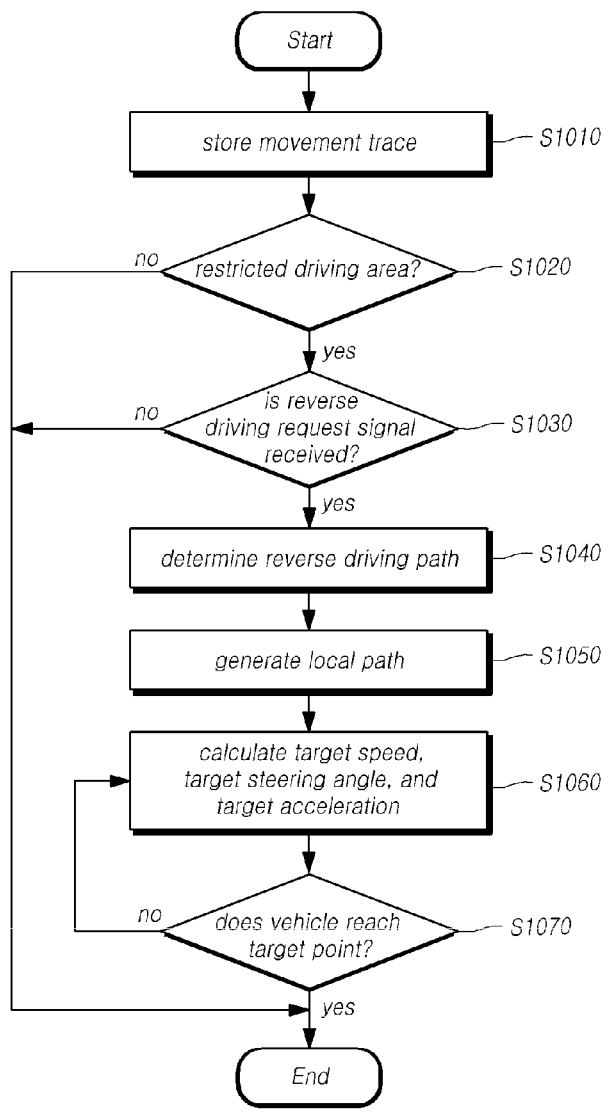
FIG. 10 is a flowchart illustrating another embodiment of the reverse driving control method according to the present disclosure.

FIG. 10 is a flowchart illustrating another embodiment of the reverse driving control method according to the present disclosure.

Referring to FIG. 10, in the reverse driving control method according to the present disclosure, a movement trace of a vehicle moving forward is detected and stored in S1010.

When the movement trace is stored, it is identified whether the vehicle 10 enters a restricted driving area in S1020 in the reverse driving control method according to the present disclosure.

When it is identified that the vehicle 10 enters the restricted driving area, it is identified whether a reverse driving request signal is received from a driver in S1030 in the reverse driving control method according to the present disclosure.

When the reverse driving request signal is received, one or more driving paths are generated on the basis of the stored movement trace and a reverse driving path is determined on the basis of the one or more generated driving paths in S1040 in the reverse driving control method according to the present disclosure.

When the reverse driving path is determined, the vehicle 10 is reversed along the reverse driving path, but if there is a target on the reverse driving path, a local path is generated to allow the vehicle 10 to be reversed while avoiding the target in S1050 in the reverse driving control method according to the present disclosure.

In the reverse driving control method according to the present disclosure, a target speed, a target steering angle, and a target acceleration are calculated to allow the vehicle 10 to reach a target point of the reverse driving path in S1060.

In the reverse driving control method according to the present disclosure, it is determined whether the vehicle 10 reaches the target point in S1070 and step 1070 is continuously performed until the vehicle 10 reaches the target point.

When the vehicle 10 reaches the target point, the reverse driving control method according to the present disclosure ends the reverse driving control operation according to the present disclosure.

The aforementioned controller (or control unit) and/or the components thereof may include one or more processors/microprocessors coupled with a computer readable recording medium storing computer readable code/algorithm/software. The processor(s)/microprocessor(s) may perform the above described functions, operations, steps, etc., by executing the computer readable code/algorithm/software stored on the computer readable recording medium.

The aforementioned controller (or control unit) and/or the components thereof may be provided with, or further include, a memory implemented as a non-transitory computer readable recording medium or a transitory computer readable recording medium. The memory may be controlled by the aforementioned controller (or control unit) and/or the components thereof, and be configured to store data transmitted to/from the aforementioned controller (or control unit) and/or the components thereof or configured to store data processed or to be processed by the aforementioned controller (or control unit) and/or the components thereof.

The present disclosure can also be embodied as computer readable code/algorithm/software stored on a computer readable recording medium. The computer readable recording medium may be a non-transitory computer readable recording medium such as a data storage device that can store data which can thereafter be read by a processor/microprocessor. Examples of the computer readable recording medium include a hard disk drive (HDD), a solid state drive (SSD), a silicon disc drive (SDD), read-only memory (ROM), CD-ROM, magnetic tapes, floppy disks, optical data storage devices, etc. As described above, according to the present disclosure, it is possible to provide an apparatus and a method for controlling a reverse driving to provide driving convenience by controlling an autonomous reverse driving when a vehicle enters a dead end or a one-way street by mistake.

Further, according to the present disclosure, it is possible to prevent a safety accident by providing an apparatus and a method for controlling a reverse driving by which a vehicle can be autonomously reversed while avoiding obstacles existing in the back of the vehicle.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An apparatus for controlling a reverse driving of a vehicle, the apparatus comprising:

an image acquisition device, mounted to the vehicle, configured to capture image data indicating a field of view of the image acquisition device including an exterior of the vehicle;
a location information receiver configured to receive location information of the vehicle; and
a controller comprising at least one processor configured to process at least one of the image data captured by the image acquisition device or the location information, wherein the controller is configured to:
identify a restricted driving area, based on at least one of a processing result of the image data or the location information,
prior to determining a reverse driving path, in response to the identification of the restricted driving area, and in response to a receipt of a turn signal toward the restricted driving area or a determination that the vehicle drives towards the restricted driving area, control an output device to output information indicating the restricted driving area,
receive a reverse driving request signal,
determine the reverse driving path, based on a pre-stored movement trace of the vehicle when the restricted driving area is identified, and
control movement of the vehicle to autonomously reverse the vehicle based on the reverse driving path.

2. The apparatus of claim 1, wherein the controller is further configured to correct the location information by matching the location information with map information and the processing result of the image data while the vehicle moves forward, and detect a movement trace from the corrected location information, and
the controller is further configured to generate a driving path that matches the movement trace and determines the driving path as the reverse driving path.

3. The apparatus of claim 2, wherein the controller is further configured to store a movement trace corresponding to a preset reference distance in the detected movement trace and update the stored movement trace while the vehicle moves forward, and
the controller is further configured to generate a driving path that matches the movement trace and determine the driving path as the reverse driving path.

4. The apparatus of claim 2, wherein the reverse driving request signal contains indication information indicating a target point, and the controller is further configured to identify the target point from the indication information and to determine a path from the location of the vehicle to the target point along the generated driving path as the reverse driving path.

5. The apparatus of claim 1, wherein the controller is further configured to generate a driving path corresponding to the movement trace and based on the map information at the location of the vehicle and determine the driving path as the reverse driving path.

6. The apparatus of claim 1, wherein the controller is further configured to generate a first driving path that matches the movement trace and a second driving path corresponding to the movement trace and based on the map information at the location of the vehicle, select one of the first driving path and the second driving path, and determine the selected driving path as the reverse driving path.

7. The apparatus of claim 1, wherein the controller is further configured to control movement of the vehicle by calculating at least one of a target acceleration, a target speed, or a target steering angle.

8. The apparatus of claim 1, wherein, when the restricted driving area is identified, the controller is further configured to perform at least one control of deceleration control for decelerating the vehicle or warning control for providing a warning.

9. The apparatus of claim 1, wherein the restricted driving area includes a dead end or a one-way street.

10. A vehicle comprising the apparatus of claim 1.

11. An apparatus for controlling a reverse driving, the apparatus comprising:
an image acquisition device, disposed at a vehicle, configured to capture image data indicating a field of view of the image acquisition device including an exterior of the vehicle;
a non-image sensor, mounted to the vehicle, configured to capture sensing data indicating a field of sensing of the image acquisition device including the exterior of the vehicle;
a location information receiver configured to receive location information of the vehicle; and
a domain controller comprising a processor configured to process at least one piece of the image data captured by the image acquisition device or the sensing data captured by the non-image sensor, and further to process the location information,
wherein the domain controller is configured to:
detect and store a movement trace of the vehicle moving forward,
identify a restricted driving area, based on at least one of a processing result of the image data, the location information, or pre-stored map information,
prior to determining a reverse driving path, in response to the identification of the restricted driving area, and in response to a receipt of a turn signal toward the restricted driving area or a determination that the vehicle drives towards the restricted driving area, control an output device to output information indicating the restricted driving area,
receive a reverse driving request signal,
generate one or more driving paths, based on the stored movement trace when the reverse driving request signal is received,
determine the reverse driving path, based on the one or more driving paths, and
control movement of the vehicle to autonomously reverse the vehicle based on the reverse driving path.

12. An apparatus for controlling a reverse driving of a vehicle, the apparatus comprising:
an image acquisition device, mounted to the vehicle, configured to capture image data indicating a field of view of outside of the vehicle; and
a processor configured to:
detect and store a forward movement trace of the vehicle from a first location to a second location, based on the image data and location information of the vehicle,
in response to a detection of a restricted driving area, receive a reverse driving request signal,
prior to determining a reverse driving path, in response to the detection of the restricted driving area, and in response to a receipt of a turn signal toward the restricted driving area or a determination that the vehicle drives towards the restricted driving area, control an output device to output information indicating the restricted driving area, determine, based on the forward movement trace of the vehicle, the reverse driving path from the second location toward the first location, and output a control signal to autonomously control the vehicle to reverse based on the reverse driving path.

13. The apparatus according to claim 12, wherein the processor is further configured to identify the restricted driving area, based on at least one of the image data or the location information.

14. The apparatus according to claim 12, wherein the processor is further configured to:
generate a driving path corresponding to the forward movement trace and based on map information at a location of the vehicle and determine the driving path as the reverse driving path.

15. The apparatus of claim 12, wherein the processor is further configured to:
determine a first driving path that matches the forward movement trace and a second driving path corresponding to the forward movement trace and based on map information at a location of the vehicle,
select one of the first driving path and the second driving path, and
determine the selected driving path as the reverse driving path.

16. The apparatus of claim 12, wherein the restricted driving area includes a dead end or a one-way street.

17. A vehicle comprising the apparatus of claim 12.

18. A method for controlling a reverse driving of a vehicle, the method comprising:
receiving image data indicating a field of view of outside of the vehicle;
detecting and storing a forward movement trace of the vehicle from a first location to a second location, based on the image data and location information of the vehicle;
in response to a detection of a restricted driving area, receiving a reverse driving request signal,
prior to determining a reverse driving path, in response to the detection of the restricted driving area, and in response to a receipt of a turn signal toward the restricted driving area or a determination that the vehicle drives towards the restricted driving area, controlling an output device to output information indicating the restricted driving area,
determining, based on the forward movement trace of the vehicle, the reverse driving path from the second location toward the first location; and
outputting a control signal to control the vehicle to autonomously reverse based on the reverse driving path.

19. The method according to claim 18, wherein the restricted driving area is identified based on at least one of the image data or the location information.

20. The method according to claim 18, further comprising:
generating a driving path corresponding to the forward movement trace and based on map information at a location of the vehicle and determining the driving path as the reverse driving path.

21. The method according to claim 18, further comprising:
determining a first driving path that matches the forward movement trace and a second driving path corresponding to the forward movement trace and based on map information at a location of the vehicle,
selecting one of the first driving path and the second driving path, and
determining the selected driving path as the reverse driving path.

22. A non-transitory computer-readable medium storing computer-executable instructions, that, when executed by a processor, cause the processor to perform the method of claim 18.

* * * * *